United States Patent
Jobe et al.

(10) Patent No.: US 9,648,699 B2
(45) Date of Patent: May 9, 2017

(54) AUTOMATIC CONTROL OF LOCATION-REGISTERED LIGHTING ACCORDING TO A LIVE REFERENCE LIGHTING ENVIRONMENT

(71) Applicant: LiveLocation, Inc., Venice, CA (US)

(72) Inventors: Taylor Jobe, Venice, CA (US); Elliott Jobe, Venice, CA (US)

(73) Assignee: LiveLocation, Inc., Venice, CA (US)

( * ) Notice: Subject to any disclaimer, the term of this patent is extended or adjusted under 35 U.S.C. 154(b) by 30 days.

(21) Appl. No.: 14/635,427

(22) Filed: Mar. 2, 2015

(65) Prior Publication Data

US 2015/0250041 A1    Sep. 3, 2015

Related U.S. Application Data

(60) Provisional application No. 61/947,177, filed on Mar. 3, 2014.

(51) Int. Cl.
*H05B 37/02* (2006.01)
(52) U.S. Cl.
CPC ..... *H05B 37/0218* (2013.01); *H05B 37/0254* (2013.01); *Y02B 20/46* (2013.01)
(58) Field of Classification Search
CPC   H05B 37/02; H05B 37/0218; H05B 37/0254; H05B 37/0272
USPC ........................................ 315/152, 307, 312
See application file for complete search history.

(56) References Cited

U.S. PATENT DOCUMENTS

| | | | |
|---|---|---|---|
| 6,545,742 B2 * | 4/2003 | O'Hagan | G03B 15/02 348/E5.022 |
| 6,685,326 B2 | 2/2004 | DeBevec et al. | |
| 6,983,082 B2 | 1/2006 | Duiker | |
| 7,070,277 B2 | 7/2006 | Trumbull | |
| 2005/0116667 A1 * | 6/2005 | Mueller | E04F 13/08 315/312 |
| 2005/0275626 A1 * | 12/2005 | Mueller | H05B 37/029 345/156 |
| 2012/0293075 A1 | 11/2012 | Engelen et al. | |
| 2013/0165741 A1 | 6/2013 | Seabury et al. | |

OTHER PUBLICATIONS

International Search Report and Written Opinion dated Jun. 5, 2015 issued in connection with PCT/US2015/018291.
Debevee et al., "A Single-Shot Light Probe"; USC Institute for Creative Technologies; 2008-2013.

(Continued)

*Primary Examiner* — Tung X Le
(74) *Attorney, Agent, or Firm* — Parker Ibrahim & Berg LLC; James M. Behmke; Kenneth J. Heywood

(57) ABSTRACT

According to the disclosed embodiments, a three-dimensional (3D) reference environment having one or more environmental lighting reference (ELR) sources is determined by a controller. Also, characteristics of the one or more ELR sources are tracked by the controller. Then, a lighting environment generated by the one or more ELR sources in the 3D reference environment is replicated by the controller by dynamically and automatically controlling one or more physical light sources that illuminate a physical subject according to the characteristics of the one or more ELR sources.

17 Claims, 4 Drawing Sheets

(56) References Cited

OTHER PUBLICATIONS

Kevin Kelly, "Oscar Effects: Before Alfonso Cuaron Could Make 'Gravity,' He Had to Overcome It"; Digital Trends; Feb. 24, 2014.
"A Single-Shot Light Probe—Supplemental" A_Single_Shot_Light_Probe_Supplemental-SIGGRAPH2012.pdf, 28.7 MB.
Debevee et al., A_Single_Shot_Light_Probe-SIGGRAPH2012.pdf (author version, 499 KB) ACM Digital Library.

* cited by examiner

AUTOMATIC CONTROL OF LOCATION-REGISTERED LIGHTING ACCORDING TO A LIVE REFERENCE LIGHTING ENVIRONMENT

RELATED APPLICATIONS

This application claims priority to U.S. Provisional Application No. 61/947,177, filed Mar. 3, 2014, entitled: "AUTOMATIC CONTROL OF LOCATION-REGISTERED LIGHTING ACCORDING TO A LIVE REFERENCE LIGHTING ENVIRONMENT," by Jobe et al., the contents of which are herein incorporated by reference.

TECHNICAL FIELD

The present disclosure relates generally to lighting control, and, more particularly, to the automatic control of location-registered lighting according to a reference lighting environment.

BACKGROUND

During film production, among other related practices, lighting of objects is of particular importance. This can be especially true when utilizing special effects techniques, such as chroma key compositing, including the use of a "green screen," where a simulated three-dimensional space is reproduced to virtually surround the physical objects. Typically, the lighting equipment on-set consists of large, generally un-connected groups of lights. The lights, or light arrays, may be set up individually to provide illumination to the physical objects, which may add significant time to the overall shoot and can consume the majority of hours each day on-set. Not surprisingly, this can add dramatic costs to production and can severely limit the time available to film.

SUMMARY

According to one or more embodiments of the disclosure as described in greater detail below, a three-dimensional (3D) reference environment having one or more environmental lighting reference (ELR) sources is determined. Also, characteristics of the one or more ELR sources are tracked. Then, a lighting environment generated by the one or more ELR sources in the 3D reference environment is replicated by dynamically and automatically controlling one or more physical light sources that illuminate a physical subject according to the characteristics of the one or more ELR sources.

BRIEF DESCRIPTION OF THE DRAWINGS

The foregoing and other objects, features, aspects and advantages of the embodiments disclosed herein will become more apparent from the following detailed description when taken in conjunction with the following accompanying drawings.

Figure 1:
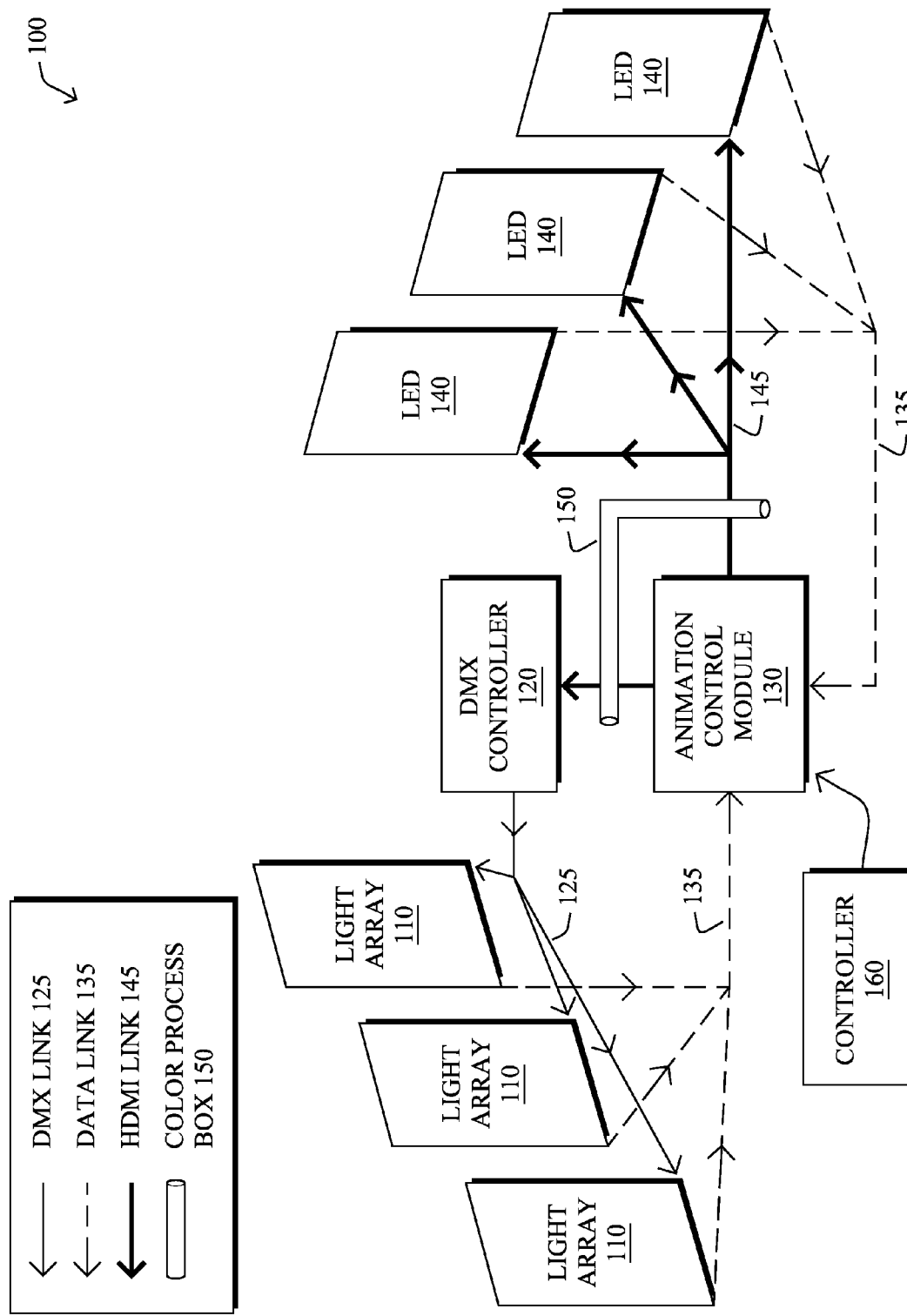
FIG. 1 illustrates an exemplary schematic diagram of a location-registered lighting system automatically controlled according to a live reference lighting environment.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF EXAMPLE EMBODIMENTS

Chroma key compositing, or color keying, is a special effects technique for compositing, e.g., layering, two images or video feeds together according to color hues, or "chroma range." The technique is used post-production to remove a background, e.g., "green screen," from the subject of a photo or video. In particular, the technology involves a color range, such as green (or any other uniform and distinct color), in the "top" layer that is made transparent, revealing another image behind. Ideally, no part of the subject being filmed or photographed should duplicate the background color.

Filming with a green screen allows a person or object, e.g., the subject, to be efficiently separated from the studio environment and instead be integrated into a background shot of a different time or place, thereby creating a "composite." The technique further allows different elements to be shot and combined in unique ways and allows people or objects to be added to an environment that would be too costly or resource-intensive to actually film. Instead, the environment may be created entirely using a computer or as artwork. Use of the green screen is especially common in the newscasting, motion picture, and videogame industries, where a physical subject may be filmed while positioned in front of a large computer-generated imagery (CGI) backdrop, though in actuality, it is a large mono-colored background. The desired result is for the subject and background environment to appear to have been photographed or filmed at the same time and place with the same camera.

Achieving a realistic composite requires accurately coordinating several aspects of the image of the subject and the image of the background. For example, the subject and background should be viewed from consistent perspectives and should exhibit the same imaging properties, such as color balance, sharpness or blurriness, brightness response curves, lens flare, and noise. Manipulating these characteristics such that they are commensurate in both the subject and background is critical for creating an authentic-looking scene.

In addition to the above concerns, a key component in generating a realistic composite involves consistent lighting of the subject and background. That is, the subject should exhibit the same lighting parameters, e.g., shading, highlights, shadows, indirect illumination, and the like, that would have been exhibited if actually present within the background environment. For instance, consider an actor being composited into a concert hall. In this case, the actor's illumination should appear to derive primarily from the concert hall's stage lighting. The actor's illumination should also change in accordance with the changing stage lights, as the characteristics of the stage lighting may be programmed to frequently vary in direction, color, intensity, etc. A myriad of other factors may further affect the illumination of the actor, including the actor's movements, background light obstructions (which may cause shadows), whether the shot is wide or close-up, reflections in the scene, and so forth.

As noted above, current lighting systems are controlled either manually or by a lighting control system, such as digital multiplex (DMX). These lighting systems most often require the input of a human, either in real-time or via a programmed lighting sequence. On a typical film set, for instance, highly skilled artisans may be required to manually place and color each light. Other lighting arrays can be controlled using a video input; however, they do not react dynamically as their background locations, e.g., distance, rotation, elevation, etc., change with respect to the environment or lighting conditions they are seeking to replicate. Moreover, these programmable light arrays are not coordinated in any particular manner, nor are they able to be integrated to a live digital set and composite.

Automated Lighting Reproduction for Live-Action Compositing

The techniques herein are directed to automatic control of location-registered lighting according to a live reference lighting environment. In particular, a real-time, spatially reactive lighting array may be powered according to a real-time environmental lighting reference. As a result, digital lighting scenarios may be automatically replicated in the practical world.

Specifically, according to one or more embodiments of the disclosure as described in detail below, a three-dimensional (3D) reference environment having one or more environmental lighting reference (ELR) sources is determined by a controller. Also, characteristics of the one or more ELR sources are tracked by the controller. Then, a lighting environment generated by the one or more ELR sources in the 3D reference environment is replicated by the controller by dynamically and automatically controlling one or more physical light sources that illuminate a physical subject according to the characteristics of the one or more ELR sources.

Illustratively, the techniques described herein may be performed by hardware, software, and/or firmware. In addition, the techniques herein may be treated as extensions to existing standards for digital communication networks, e.g., DMX, or other communication techniques suitable for controlling environmental lighting and effects, and as such, may be processed by similar components understood in the art that execute those techniques, accordingly.

FIG. 1 illustrates an exemplary schematic diagram of a location-registered lighting system automatically controlled according to a live reference lighting environment. As shown in FIG. 1, the automated lighting system 100 includes a configuration of light arrays 110, DMX controller 120, animation control module 130, light-emitting diodes (LEDs) 140, color process box 150, and controller 160. Each of the above components of the automated lighting system 100 may be interconnected via suitable communication links, as described further below. It should be noted that the configuration depicted in FIG. 1 is for illustration purposes only and should not be treated as limiting the disclosed embodiments to the particular depicted configuration. In particular, though light arrays 110 and LEDs 140 are shown as both being present and separate, a system 100 may only comprise light arrays 110, or only LEDs 140, or any combination/arrangement of light arrays and LEDs as desired.

The light arrays 110 may include a grouping of one or more lighting instruments in any suitable arrangement, such as a panel. For example, the light arrays 110 may be a Fresnel, which typically consists of a metal housing, a reflector, a lamp assembly, and a Fresnel lens. The lighting instruments of the light arrays 110 may include any type of illumination device suitable for lighting a typical film set, including, for example, LEDs, fluorescent bulbs, strobe lights, tungsten lights, hydrargyrum medium-arc iodide (HMI) lights, and the like.

The light arrays 110 may be in communication with the DMX controller 120 via a DMX link 125. Notably, although the exemplary system 100 illustratively utilizes DMX (e.g., DMX controller 120 and DMX link 125), it should be understood that any suitable digital communication technique used to control stage lighting and effects may be utilized, and DMX is merely used for demonstration purposes only.

A DMX network, such as a DMX512 network, may employ a multi-drop bus topology with nodes strung together, e.g., a "daisy chain." The DMX network may consist of a single DMX controller, e.g., DMX controller 120, and one or more slave devices. For example, a lighting console may be employed as the DMX controller 120, while the slave devices may include, for example, light arrays 110, as well as other devices such as dimmers, fog machines, and the like. Thus, in addition to being in communication with the light arrays 110, the DMX controller may further be in communication with additional devices not shown in FIG. 1.

The DMX controller 120 may transmit lighting control signals to the light arrays 110 using the DMX link 125, which may be a suitable DMX cable, for example. Alternatively, lighting control signals may be wirelessly transmitted from the DMX controller 120 to the light arrays 110. In this case, the DMX controller 120 may be equipped with a wireless transmitter, while strategically placed receivers may be positioned near the light arrays 110 to convert the wireless signal back to a conventional DMX wired network signal. The lighting control signals from the DMX controller 120 may control the lighting of the light arrays 110. For example, the lighting control signals may be operable to adjust the intensity, color, direction, and so forth, of the light produced by the light arrays 110. Moreover, the lighting control signals may be sent at the command of the controller 160 via the animation control module 130, as described further below.

In response to receiving lighting control signals, the light arrays 110 may transmit status signals to the animation control module 130 via the data link 135. The data link 135 may be any suitable communication link, including wired, wireless, and so forth. In particular, the status signals may indicate the positioning, e.g., location, angle, etc., of each of the light arrays 110. This way, the animation control module 130 may be aware of the positioning of each of the light arrays 110 and LEDs 140, thus allowing for all of the light sources in the system 100 to be effectively coordinated.

The animation control module 130 may be a computer graphics generation platform, such as Autodesk Maya™, which is generally used to generate three-dimensional assets for use in film, television, game development and architecture. The animation control module 130 (alternatively referred to as a "3D reference environment determining module") may be utilized to determine a three-dimensional (3D) reference environment having one or more environmental lighting reference (ELR) sources. The 3D reference environment may, for example, be any simulated (e.g., computer-generated) environment or any real-life environment. The ELR sources may represent light sources—either real or computer-generated—in the 3D reference environment. For instance, where a beach setting is the 3D reference environment, a first ELR source may represent the sun, while a second ELR source may represent sunlight reflecting off nearby buildings. Then, a physical subject (e.g., actor, object, etc.) may be recorded and/or superimposed in a replication (e.g., staged environment) of the 3D reference environment using post-production techniques known in the art. In doing so, the physical subject should be illuminated in accordance with physical light sources that emulate the ELR sources in the 3D reference environment.

In the case that the 3D reference environment is computer-generated, the 3D reference environment may be generated by the animation control module 130, or it may be previously generated, archived, and subsequently accessed by the animation control module 130. By having knowledge of the 3D reference environment, the animation control module 130 may determine and track characteristics of the ELR source(s) therein, including, for example, the ELR source's direction, color, location, intensity, and so forth. Notably, the ELR source characteristics may constantly change in conjunction with the changing 3D reference environment (e.g., a virtual camera panning around the reference environment). Thus, using the knowledge of the 3D reference environment, as well as the ELR source(s) therein, the animation control module 130 may dynamically and automatically control the light arrays 110 and LEDs 140, e.g., by adjusting their position, direction, intensity, and so forth, so as to replicate the ELR sources in the physical world. It should be noted that the dynamic control of the light arrays 110 and LEDs 140 to replicate the ELR sources may alternatively, or additionally, be performed by the controller 160.

Additionally, the animation control module 130 may transmit DMX control signals to the DMX controller 120 (which may then transmit lighting control signals to the light arrays 110, as described above) and may receive status signals from the light arrays 110 and LEDs 140 via the data links 135. Furthermore, the animation control module 130 may transmit LED control signals to the LEDs 140 so as to adjust the intensity, color, direction, and so forth, of the light produced by the LEDs. The LED control signals may be transmitted from the animation control module 130 via the HDMI link 145. Although the HDMI link 145 is illustratively included in the system 100, it should be understood that any suitable link may be used for the animation control module 130 to communicate with the LEDs 140, including, for example, a high-definition serial digital interface (HD-SDI) link. Also, the signals transmitted from the animation control module 130 may optionally traverse the color process box 150 before reaching the desired destination device.

In response to receiving LED control signals, the LEDs 140 may transmit status signals to the animation control module 130 via the data link 135, in a similar manner as the light arrays 110. In particular, the status signals may indicate the positioning, e.g., location, angle, etc., of each of the LEDs 140. Thus, as explained above, the animation control module 130 may be aware of the positioning of each of the light arrays 110 and LEDs 140, thus allowing for all of the light sources in the system 100 to be effectively coordinated.

The controller 160 may effectively manage the automated lighting system 100 via commands sent to the animation control module 130. The controller 160 may utilize a "prelink" in its communications with the animation control module 130 in order to link or store frequently used programs for subsequent program executions, thereby reducing overall operation time and increasing system efficiency. It should be understood that although the controller 160 is depicted as separate from the DMX controller 120 and animation control module 130, the controller 160 may be implemented as an internal device in either of these components or incorporate the functions of DMX controller 120 and/or animation control module 130 therein. Furthermore, the illustrated arrangement of the automated lighting system 100 in FIG. 1, particularly with respect to the controller 160, is for demonstration purposes only and should not be treated as limiting the disclosed techniques to the illustrated configuration.

According to one or more embodiments disclosed herein, the automated lighting system 100 may dynamically and automatically replicate the lighting of a three-dimensional (3D) reference environment. For example, in a scenario where an actor is superimposed into a 3D CGI concert hall, as referenced above, the primary light source in the virtual concert hall may be stage lights positioned in front of the actor. Thus, physical light arrays in the automated lighting system 100, such as the light arrays 110, LEDs 140, and/or other lighting devices included in the system, can be automatically and dynamically controlled in real-time, e.g., by the controller 160, DMX controller 120, animation control module 130, and/or other suitable components in the automated lighting system 100, so as to replicate the illumination generated by the virtual stage lights in the CGI concert hall.

Furthermore, the light arrays 110, LEDs 140, and/or other lighting devices in the automated lighting system 100 may change dynamically without any human control input (other than physical location) to reflect their changing positions in the 3D environmental space. This may be accomplished, in part, by location data streaming from the light arrays 110 and LEDs 140 to the animation control module, allowing for accurate coordination of the physical light sources and 3D reference space. Moreover, using the data transmitted between the light sources and DMX controller 120/animation control module 130, the automated lighting system 100 may convert the location of registered positions of the light arrays 110 and LEDs 140 into lighting control inputs in real-time.

As a result, the physical lights, on a film set, for example, can reflect the relevant lighting of their position in the digital environment regardless of whether the lights are moving, the environment is moving, or both. That is, the physical space registration, e.g., tracking, of the light arrays 110, LEDs 140, and so forth, may correspond to the digital coordinate sets of the environmental lighting reference source, e.g., virtual light source in the 3D environmental space. Therefore, the automated lighting system 100 may provide for an efficient, integrated system that utilizes a digital set to drive real-time lighting in the physical world.

Figure 2:
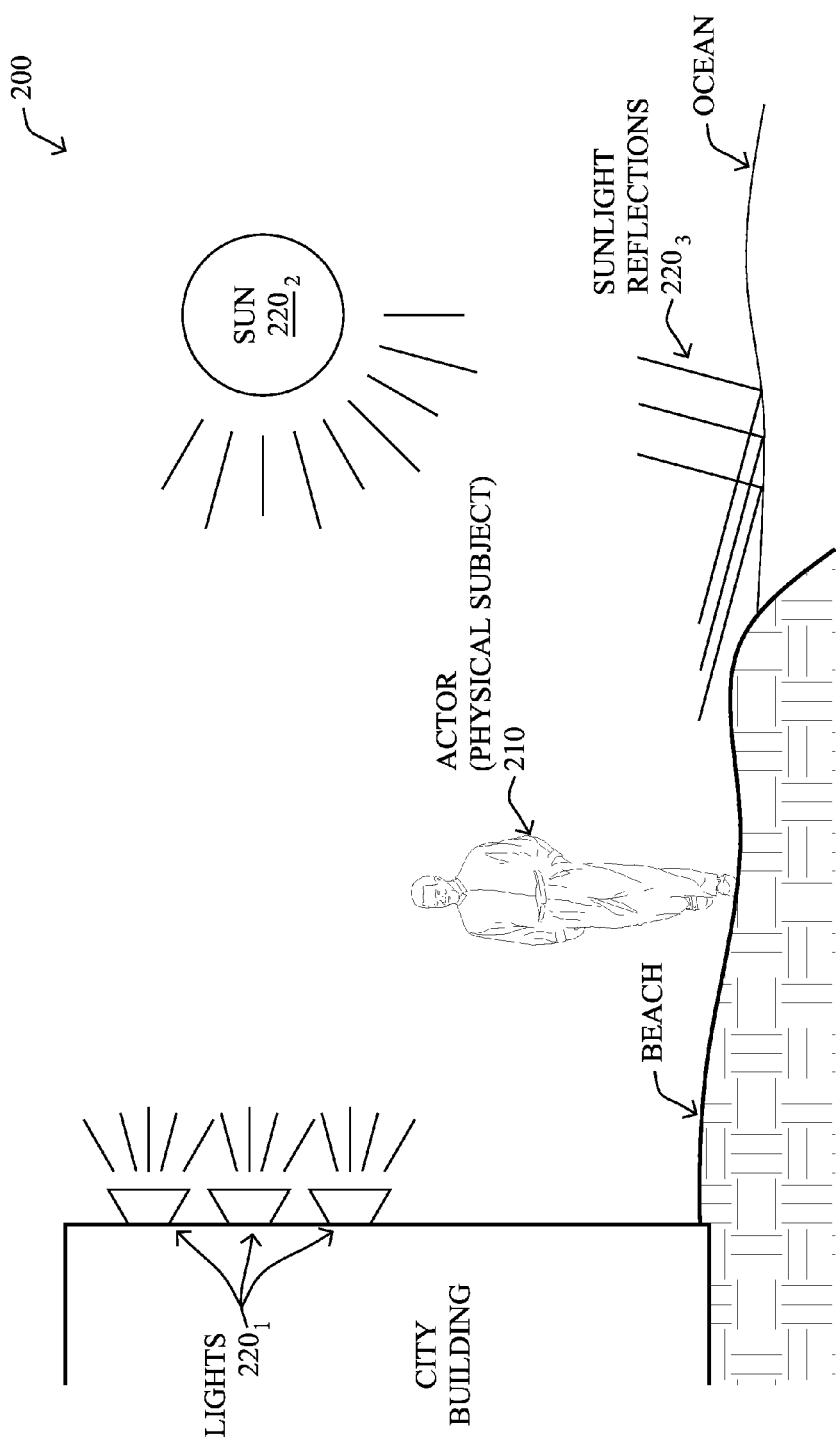
FIG. 2 illustrates an example diagrammatic view of a 3D reference environment having one or more ELR sources.

As a specific example, assume a beach setting as illustrated in FIG. 2. In the illustrative 3D reference environment 200, an actor (e.g., "physical subject") 210 is located on a beach next to an ocean and surrounded by a number of ELR sources $220_1$-$220_3$. In this example, the ELR sources include lights from a nearby building $220_1$, the sun $220_2$, and sunlight reflecting off the ocean $220_3$. Any variation of ELR sources may exist in the 3D reference environment 200, and the ELR sources $220_1$-$220_3$ are shown for demonstration purposes only.

As would be expected, the actor 210 is illuminated by each of the ELR sources $220_1$-$220_3$ in the 3D reference environment 200 in a manner particular to the current state of each respective ELR source. In the techniques herein, the lighting sources, e.g., their color, intensity, etc., may be detected, such as through a camera located within the reference environment taking images of the scene (e.g., 360-degrees worth), or using any other light detection device. By detecting the illumination provided by the physical sources (or digital sources in a computer-generated environment), the techniques herein may convert those environmental lighting sources into a staged environment, as described herein.

Notably, as the characteristics of the ELR sources $220_1$-$220_3$ change, e.g., changes in interior lighting sources, weather, the time of day, etc., or even based on scene changes (e.g., filming an actor to be superimposed on a beach, and then quickly changing the scene to allow filming an actor to be superimposed within a concert hall), the illumination of the actor 210 also changes correspondingly. Thus, when considering a staged environment (e.g., while shooting a film), in order to effectively and believably replicate the lighting environment caused by the ELR sources $220_1$-$220_3$ in the 3D reference environment 200, the techniques herein disclose a procedure by which one or more physical light sources that illuminate a physical subject may be dynamically and automatically controlled according to the characteristics of the ELR sources $220_1$-$220_3$.

Figure 3:
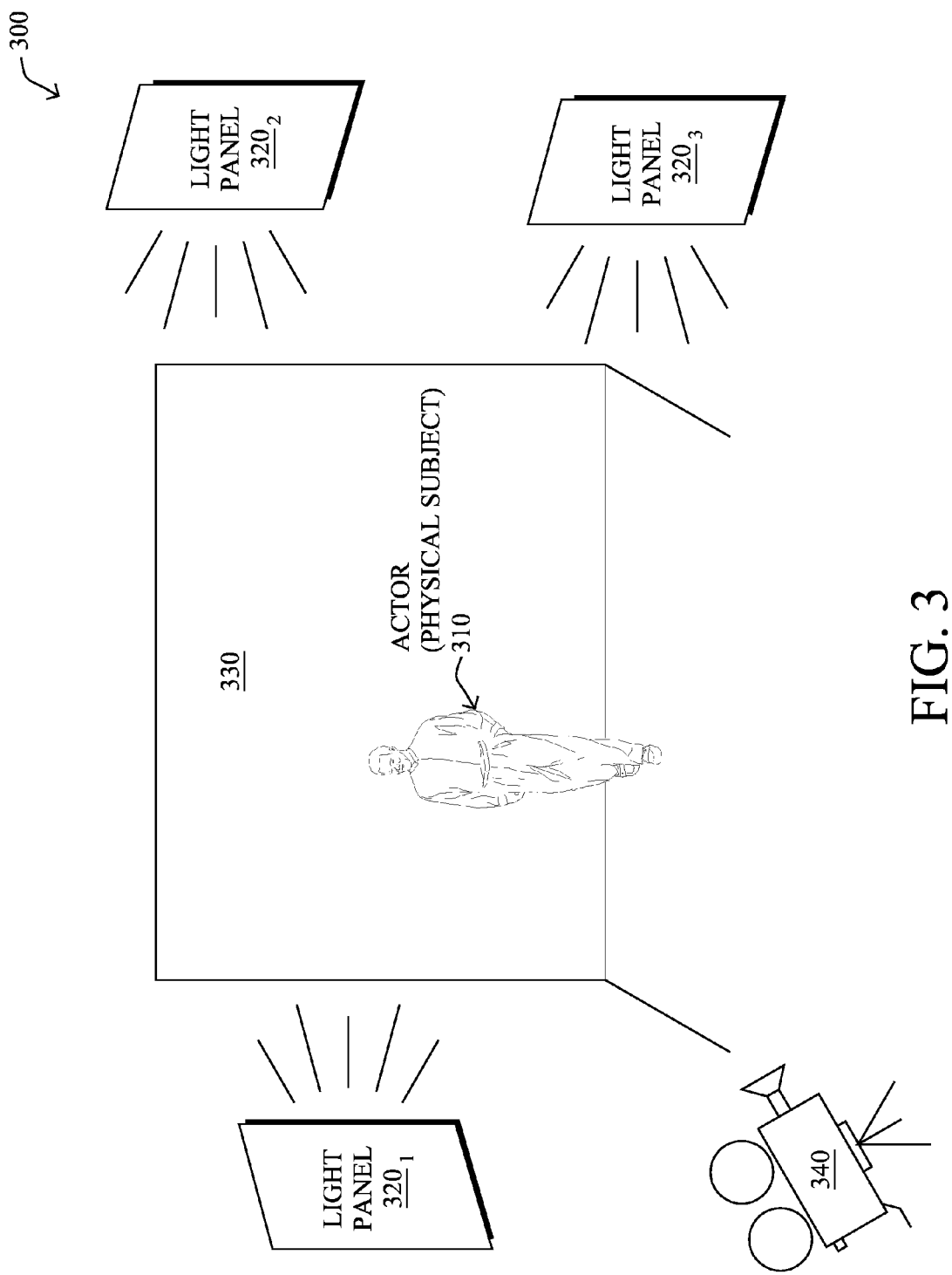
FIG. 3 illustrates an example diagrammatic view of a staged environment having one or more physical light sources configured to replicate the lighting environment generated by the ELR sources in the 3D reference environment of FIG. 2.

Accordingly, based on the 3D reference environment 200, a staged environment may be created having one or more physical light sources that can illuminate a physical subject emulating the ELR sources $220_1$-$220_3$, as if the physical subject were actually in the 3D reference environment 200. To this point, as shown in FIG. 3, a staged environment 300 including an actor 310 and one or more physical light sources $320_1$-$320_3$ may be created to replicate the lighting environment generated by the one or more ELR sources $220_1$-$220_3$ in the 3D reference environment 200. This may be accomplished by dynamically and automatically controlling the one or more physical light sources $320_1$-$320_3$ that illuminate the physical subject 310 according to the (often varying) characteristics of the one or more ELR sources $220_1$-$220_3$. In essence, the lights of the staged environment 300 are configured to create lighting of the subject (e.g., actor) based on the lighting the subject would have received had it been located in the reference environment (e.g., standing at the beach).

In the staged environment 300, the physical light sources $320_1$-$320_3$ may be any variety of light sources suitable for stage lighting, such as an LED panel, for example. In FIG. 3, the physical light sources $320_1$, $320_2$, and $320_3$ illustratively correspond to the ELR sources $220_1$, $220_2$, and $220_3$ of the 3D reference environment 200, respectively. However, separate physical light source units are not necessarily required, as a single lighting unit may be sufficient to replicate multiple ELR sources. Also, a physical light source is not necessarily required to correspond only to one ELR source. Thus, the depiction of the physical light sources $320_1$-$320_3$ and ELR sources $220_1$-$220_3$ do not limited the disclosed embodiments, but are for demonstration purposes only.

As described above, the characteristics of the ELR sources $220_1$-$220_3$ may be tracked over a period of time, which may be predetermined prior to the tracking. Also, the tracking of characteristics may be performed according to a predetermined schedule. These characteristics, such as position, intensity, color, and so forth, may change throughout the period of time. For example, in the beach setting illustrated as the 3D reference environment 200, the position of the sun $220_2$ will be lowered toward the horizon as sun is setting. Moreover, as the sun sets, the color of the sun $220_2$ may change from an intense white to a softer orange or red. As the characteristics of the light emitted from the sun $220_2$ change, so too would the light reflecting off the ocean water $220_3$. Moreover, while the building lights $220_1$ may be turned down or completely off while the sun $220_2$ is shining, after the sun sets, the building lights $220_1$ may be illuminated and may emit a bright fluorescent light.

As such, by tracking the characteristics of the ELR light sources $220_1$-$220_3$ in the 3D reference environment 200 (which may be real or computer-generated), the resultant lighting environment may be replicated in the staged environment 300 by dynamically and automatically controlling the one or more physical light sources $320_1$-$320_3$ that illuminate the physical subject 310 accordingly. For example, to replicate an early afternoon at the beach 200, the physical light sources $320_2$ and $320_3$, which may correspond to the sun $220_2$ and reflections $220_3$, respectively, may be positioned at the appropriate angle/height and may emit a bright whitish light onto the actor 310. Conversely, to replicate a night at the beach 200, the physical light source $320_1$, which may correspond to the building lights $220_1$, may emit a bright fluorescent light onto the actor 310, whereas the physical light sources $320_2$ and $320_3$ may be turned off completely. Alternatively, the physical light sources $320_2$ and $320_3$ may emit a soft whitish light to simulate moonlight. By dynamically and automatically controlling the physical light sources $320_1$-$320_3$, as described above, a realistic and believable lighting environment may be achieved in a staged environment. Effectively, therefore, the system herein converts detected or determined light from a reference environment, into light source controls for use within a staged environment to produce the same lighting effect on a subject within that environment.

Furthermore, the physical light sources $320_1$-$320_3$ in the staged environment 300 can be tracked in physical space so they are registered to a corresponding location in the 3D reference environment 200. Therefore, the physical light sources $320_1$-$320_3$ may respond to the controller (e.g., controller 120 and/or 160) based on where it is located physically on the set. For instance, if a light (e.g., ELR light source) were moved from one side of the 3D reference environment 200 to another (e.g., from the building lights-side ($220_1$) to the sun-side ($220_2$)), a corresponding physical light source 320 in the staged environment 300 may modify its lighting characteristics (in the manner described above) according to its physical location on the set. That is, the physical light source 320 may respond to the controller by modifying its lighting characteristics using additional knowledge of its own physical location on set. As a result, each of the physical light sources $320_1$-$320_3$ may perform in a manner unique to their respective locations. The location of the physical light sources $320_1$-$320_3$ may be communicated to the controller so that the controller is aware of the location of each light source in the staged environment 300. The communication may be achieved in a variety of ways, such as using an RF locator or other communication means illustrated in FIG. 1, for example.

Optionally, a green screen 330 (or other similar technique) may be utilized in the staged environment 300 and positioned behind the actor 310 in order to further create a believable and realistic scene. Moreover, one or more cameras 340 may be positioned so as to record the actor 310, who is being illuminated by the dynamically and automatically controlled physical light sources $320_1$-$320_3$.

Figure 4:
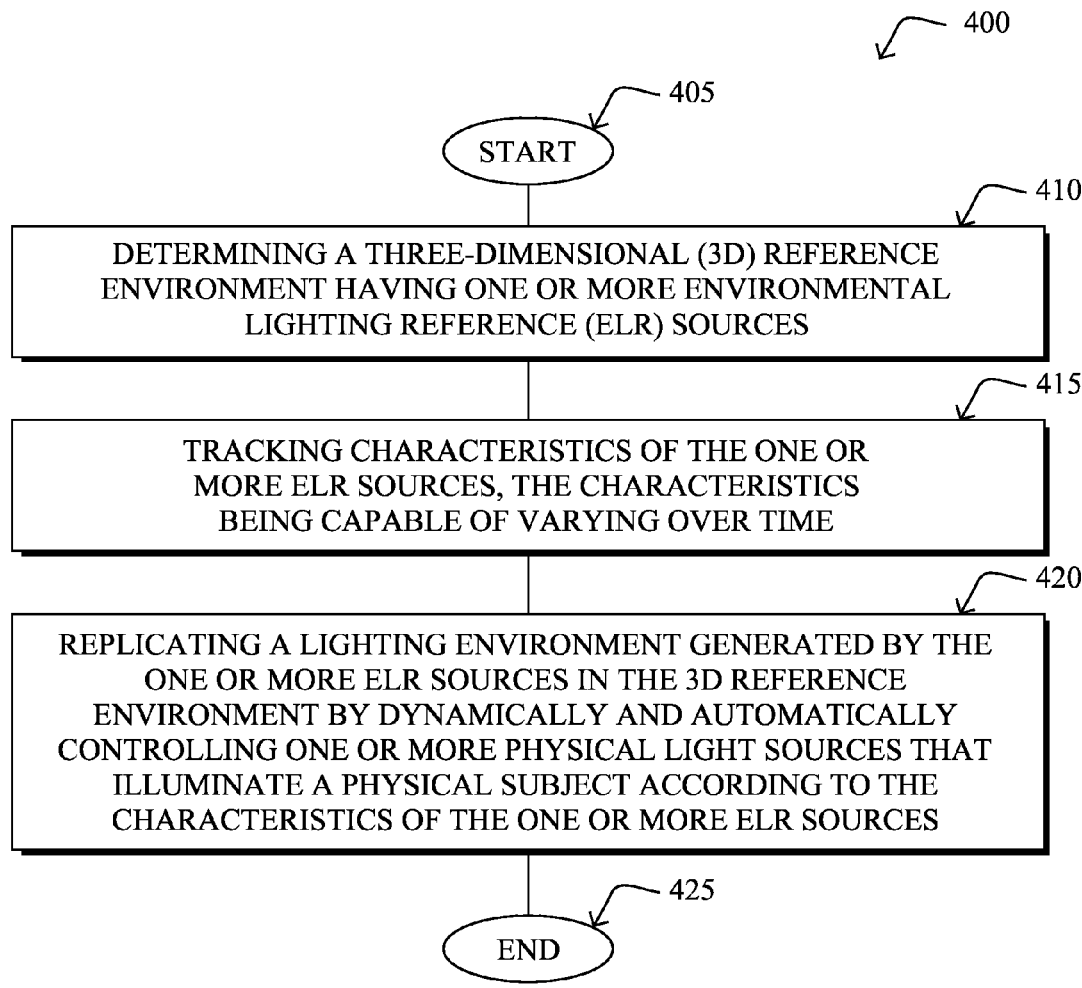
FIG. 4 illustrates an example simplified procedure for automatic control of location-registered lighting according to a live reference lighting environment.

FIG. 4 illustrates an example simplified procedure for automatic control of location-registered lighting according to a live reference lighting environment. The procedure 400 may start at step 405, and continues to step 410, where, as described in greater detail above, the location of registered positions of the physical illumination instruments may be converted into lighting control inputs in real-time, according to a simulated environmental space.

At step 410, a 3D reference environment having one or more ELR sources is determined. A "3D reference environment determining module," e.g., animation control module 130, may be utilized to determine the 3D reference environment, as well as the ELR sources therein. The 3D reference environment may, for example, be any simulated environment (e.g., CGI, generated by the animation control module 130) or any real-life environment. The ELR sources may represent light sources—either real or computer-generated—in the 3D reference environment.

At step 415, characteristics of the one or more ELR sources are determined/tracked. The characteristics of the one or more ELR sources may be determined based on various sensing/imaging devices, such as camera images of the environment, illumination detectors, etc., and may occur over a period of time. That is, these characteristics, such as position, intensity, color, and so forth, may change throughout the period of time.

Then, at step 420, a lighting environment generated by the one or more ELR sources in the 3D reference environment is replicated by dynamically and automatically controlling one or more physical light sources that illuminate a physical subject according to the characteristics of the one or more ELR sources. By dynamically and automatically the physical light sources, as described above, a realistic and believable lighting environment may be achieved in a staged environment.

The simplified procedure 400 illustratively ends at step 425. The techniques by which the steps of procedure 400 may be performed, as well as ancillary procedures, parameters, and apparatuses performing the same, are described in detail above. It should be noted that certain steps within procedure 400 may be optional, and the steps shown in FIG. 4 are merely examples for illustration. Certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for devices and procedures which may be advantageously utilized during scenarios involving chroma key compositing, such as film production. In particular, the disclosed techniques and devices greatly simplify on-set workflow, and as a result, dramatically save time required to set up initial lighting and change the lighting, as well as saving costs in lighting rentals and on-set labor needed for manually placing and adjusting lights for production. Even more, the disclosed techniques and devices may provide the possibility of creating more realistic and dynamic lighting scenarios.

While there have been shown and described illustrative embodiments that provide for automatic control of location-registered lighting according to a live reference lighting environment, it is to be understood that various other adaptations and modifications may be made within the spirit and scope of the embodiments herein, with the attainment of some or all of their advantages. For instance, it is expressly contemplated that the components and/or elements described herein may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN). Additionally, it is understood that a number of the devices and procedures herein may be executed by at least one controller. The term "controller" refers to a hardware device that includes a memory and a processor. The memory is configured to store program instructions, and the processor is specifically configured to execute said program instructions to perform one or more processes which are described further below. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a controller, a three-dimensional (3D) reference environment having one or more environmental lighting reference (ELR) sources;
   tracking, by the controller, characteristics of the one or more ELR sources; and
   replicating, by the controller, a lighting environment generated by the one or more ELR sources in the 3D reference environment by dynamically and automatically controlling one or more physical light sources that illuminate a physical subject according to the characteristics of the one or more ELR sources, wherein replicating the lighting environment comprises:
   adjusting, by the controller, a height or angle of a particular physical light source to illuminate the physical subject with light from the particular physical light source, wherein the light has the same characteristics as light from a particular ELR source in the 3D reference environment.

2. The method as in claim 1, wherein determining the 3D reference environment having one or more ELR sources comprises:
   detecting, by a light detection device, light generated by one or more physical ELR sources.

3. The method as in claim 1, further comprising:
   generating a computer-generated imagery (CGI) environment as the 3D reference environment.

4. The method as in claim 3, wherein determining the 3D reference environment having one or more ELR sources comprises:
   identifying simulated light generated by one or more virtual ELR sources in the CGI environment.

5. The method as in claim 1, wherein tracking the characteristics of the one or more ELR sources comprises:
   tracking one or more of: a direction, an intensity, or a color of light generated by each of the one or more ELR source in the 3D reference environment.

6. The method as in claim 5, wherein tracking the characteristics of the one or more ELR sources comprises:
   tracking changes in the characteristics of the one or more ELR sources over a predetermined amount of time.

7. A system, comprising:
   a three-dimensional (3D) reference environment determining module that determines a 3D reference environment having one or more environmental lighting reference (ELR) sources and that tracks characteristics of the one or more ELR sources; and
   a controller configured to replicate a lighting environment generated by the one or more ELR sources in the 3D reference environment by dynamically and automatically controlling one or more physical light sources that illuminate a physical subject according to the characteristics of the one or more ELR sources, wherein the controller is configured to replicate the lighting environment by adjusting a height or angle of a particular physical light source to illuminate the physical subject with light from the particular physical light source, wherein the light has the same characteristics as light from a particular ELR source in the 3D reference environment.

8. The system as in claim 7, further comprising:
a light detection device configured to detect light generated by one or more physical ELR sources, wherein the 3D reference environment determining module is configured to determine the 3D reference environment based on the light detected by the light detection device.

9. The system as in claim 7, wherein the 3D reference environment determining module is configured to generate a computer-generated imagery (CGI) environment as the 3D reference environment.

10. The system as in claim 7, wherein the 3D reference environment determining module determines the 3D reference environment by identifying simulated light generated by one or more virtual ELR sources in the CGI environment.

11. The system as in claim 7, wherein the characteristics of the one or more ELR sources comprise one or more of: a direction, an intensity, or a color of light generated by each of the one or more ELR source in the 3D reference environment.

12. The system as in claim 11, wherein the 3D reference environment determining module is configured to track changes in the characteristics of the one or more ELR sources over a predetermined amount of time.

13. The system as in claim 7, further comprising:
the one or more physical light sources, wherein the one or more physical light sources comprises a Fresnel or a light emitting diode (LED).

14. A non-transitory computer readable medium containing program instructions executable by a controller, wherein a three-dimensional (3D) reference environment determining module determines a 3D reference environment having one or more environmental lighting reference (ELR) sources and tracks characteristics of the one or more ELR sources, the computer readable medium comprising:
program instructions that replicate a lighting environment generated by the one or more ELR sources in the 3D reference environment by dynamically and automatically controlling one or more physical light sources that illuminate a physical subject according to the characteristics of the one or more ELR sources, wherein the program instructions replicate the lighting environment of the 3D reference environment by adjusting a height or angle of a particular physical light source to illuminate the physical subject with light from the particular physical light source, wherein the light has the same characteristics as light from a particular ELR source in the 3D reference environment.

15. The non-transitory computer readable medium as in claim 14, wherein the a 3D reference environment determining module determines the 3D reference environment by detecting light generated by one or more physical ELR sources using a light detection device.

16. The non-transitory computer readable medium as in claim 14, wherein the 3D reference environment determining module is configured to generate a computer-generated imagery (CGI) environment as the 3D reference environment and simulated light generated by one or more virtual ELR sources in the CGI environment, wherein the program instructions replicate the lighting environment generated by the one or more virtual ELR sources in the CGI environment.

17. The non-transitory computer readable medium as in claim 14, wherein the characteristics of the one or more ELR sources comprise one or more of: a direction, an intensity, or a color of light generated by each of the one or more ELR source in the 3D reference environment.

* * * * *